United States Patent [19]
Merchant et al.

[11] Patent Number: 6,064,558
[45] Date of Patent: *May 16, 2000

[54] ELECTRICAL SURGE PROTECTOR FOR CENTER CONDUCTOR DEVICES

[76] Inventors: Roger R. Merchant, 811-9th St., St. Paul, Nebr. 68873; William J. Bjorklund, R.R. 1, Box 143, Greeley, Nebr. 68842

[*] Notice: This patent is subject to a terminal disclaimer.

[21] Appl. No.: 09/177,322

[22] Filed: Oct. 22, 1998

[51] Int. Cl.[7] .......................................................... H02H 1/00
[52] U.S. Cl. .............................. 361/117; 361/56; 361/111; 361/120
[58] Field of Search .................................. 361/56, 58, 111, 361/113, 115, 118, 91.1, 127, 120

[56] References Cited

U.S. PATENT DOCUMENTS 5,399,962 3/1995 Merchant ..................................... 324/72

*Primary Examiner*—Stephen W. Jackson
*Attorney, Agent, or Firm*—Koley Jessen P.C. A Limited Liability Organization; Mark D. Frederiksen

[57] ABSTRACT

A electrical surge protector includes a metal tube having a pair of non-conductive stoppers mounted within each end to form an enclosed cavity therebetween. A conductor wire extends the length of the tube along the axis of the tube and projects through the stoppers. Electrically conductive filings are disposed loosely within the cavity and are of a sufficient quantity to form an electrical bridge between the tube and conductor upon the occurrence of a voltage difference of a predetermined magnitude between the tube and conductor wire. The tube is serially connected to one conductor of a two conductor cable, and the conductor wire is connected to the second conductor of the two conductor cable, such that electrical signals will pass therethrough along each conductor of the two conductor cable. A shunt wire is electrically connected between the tube and earth ground, to shunt any electrical surges and equalize the voltages between the tube and conductor wire.

16 Claims, 3 Drawing Sheets

ELECTRICAL SURGE PROTECTOR FOR CENTER CONDUCTOR DEVICES

TECHNICAL FIELD

The present invention relates generally to passive surge protection devices, and more particularly to an electrical surge protection device for apparatus having a pair of electrical conductors connected thereto.

BACKGROUND OF THE INVENTION

Lightning strikes from electrical storms are a serious threat to all types of electrical equipment. A nearby lightning strike can burn out circuits in an electrical device such that repair is impossible, and replacement is the only alternative. Other electrical disturbances, such as short circuits or electrical arcing between a pair of conductors, are an equally serious threat to electrical equipment. While there are various types of surge and spike protection apparatus on the market, they are not designed to protect against the extreme conditions present during a lightning strike or the electrical disturbance caused by arcing between a pair of conductors.

SUMMARY OF THE INVENTION

It is therefore a general object of the present invention to provide an improved protection device for shunting differing ground voltages generated during a lightning strike ground potential rise (GPR) condition.

Another object is to provide a passive surge protection apparatus which may be reused.

Yet another object is to provide a surge protection apparatus which is economical to manufacture, simple to use, and refined in appearance.

These and other objects of the present invention will be apparent to those skilled in the art.

The electrical surge protector of the present invention includes a metal tube having a pair of non-conductive stoppers mounted within each end to form an enclosed cavity therebetween. A conductor wire extends the length of the tube along the axis of the tube and projects through the stoppers. Electrically conductive filings are disposed loosely within the cavity and are of a sufficient quantity to form an electrical bridge between the tube and conductor upon the occurrence of a voltage difference of a predetermined magnitude between the tube and conductor wire. The tube is serially connected to one conductor of a two conductor cable, and the conductor wire is connected to the second conductor of the two conductor cable, such that electrical signals will pass therethrough along each conductor of the two conductor cable. A shunt wire is electrically connected between the tube and earth ground, to shunt any electrical surges and equalize the voltages between the tube and conductor wire.

DESCRIPTION OF THE PREFERRED EMBODIMENT

Figure 1:
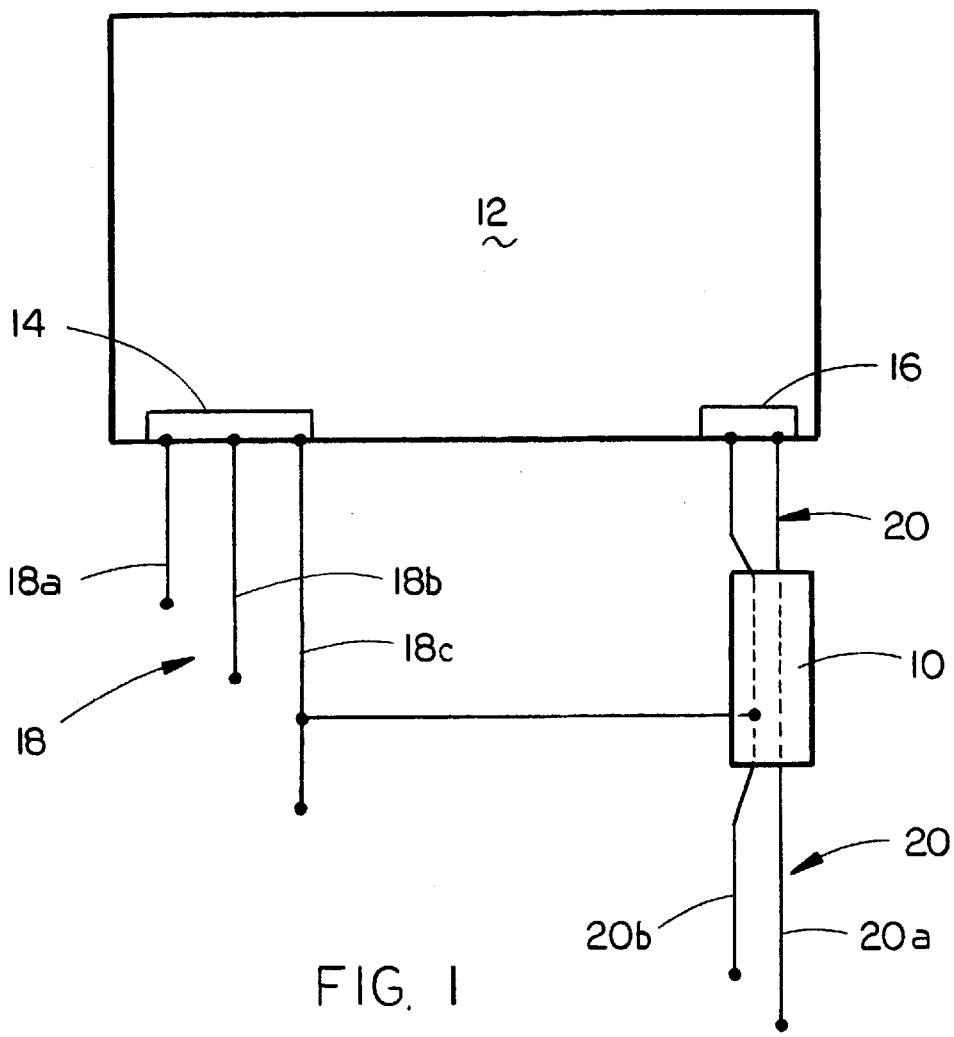
FIG. 1 is a schematic diagram showing the electrical connection of the device to a piece of electronic equipment.

Referring now to the drawings, in which similar or corresponding parts are identified with the same reference numeral, and more particularly to FIG. 1, the surge protection of the present invention is designated generally at 10 and is shown connected to a conventional electronic apparatus 12 of the type having an alternating current power terminal 14 and a coaxial radio frequency (RF) cable terminal 16.

A three conductor power line 18 is connected to terminal 14 and includes the "hot" conductor 18a, the "neutral" conductor 18b, and a safety ground conductor 18c. A coaxial RF cable 20 is electrically connected to terminal 16, and includes a center conductor 20a and a second "shield" conductor 20b as described in more detail hereinbelow, surge protector 10 is mounted in line with cable 20 such that both conductors 20a and 20b pass therethrough and continue on to terminal 16. A shunt wire 22 is electrically connected between the shield conductor 20b in surge protector 10 and ground 18c of power line 18.

Figure 3:
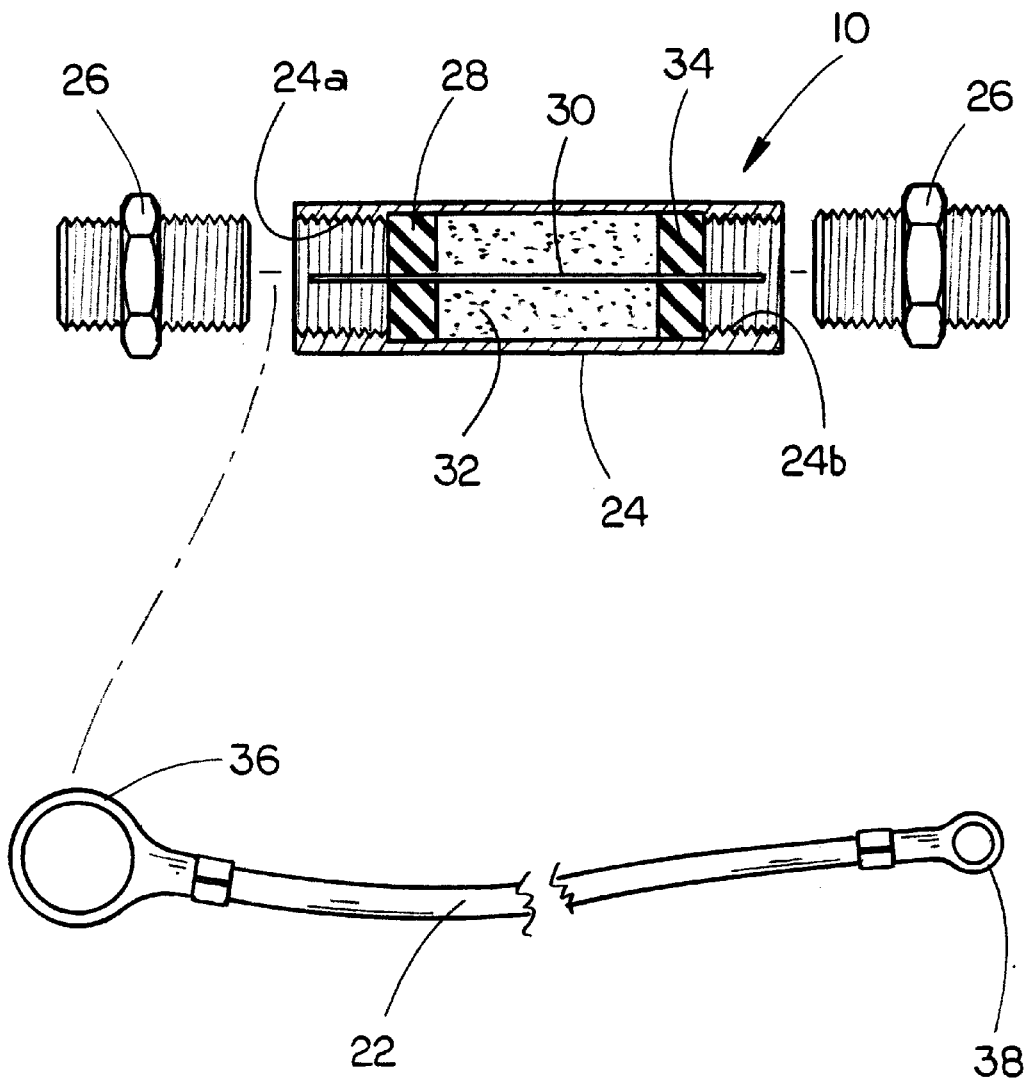
FIG. 3 is an exploded elevational view of a second embodiment of the invention, with portions of the device shown in sectional view.

Referring now to FIG. 3, surge protector 10 includes an elongated hollow metal tube 24 of an electrically conductive material. Tube 24 has opposing ends 24a and 24b which are interiorly threaded to receive coaxial line splicers 26 in each end thereof.

A stopper 28 is mounted within tube 24 proximal the first end 24a, to seal the end 24a of the tube. A center conductor wire 30 is passed through the center of stopper 28 to be received and electrically connected to a central conductor within the line splicers 26. Aluminum filings 32 are inserted within the tube to a level which will not compress when second stopper 34 is installed in second end 24b of tube 10. Center conductor 30 passes through stopper 34, and stoppers 28 and 34 thereby seal filings 32 within tube 10.

Shunt wire 22 is preferably insulated, and includes a large ring terminal 36 at one end and a small ring terminal 38 at the opposing end. Large ring terminal 36 is of a size to be received on one end of coaxial splicer 26 and electrically connected between splicer 26 and tube 10. Small ring terminal 38 is preferably sized to connect to the screw head of the grounded cover plate on an AC power receptacle, or any other ground.

Figure 2:
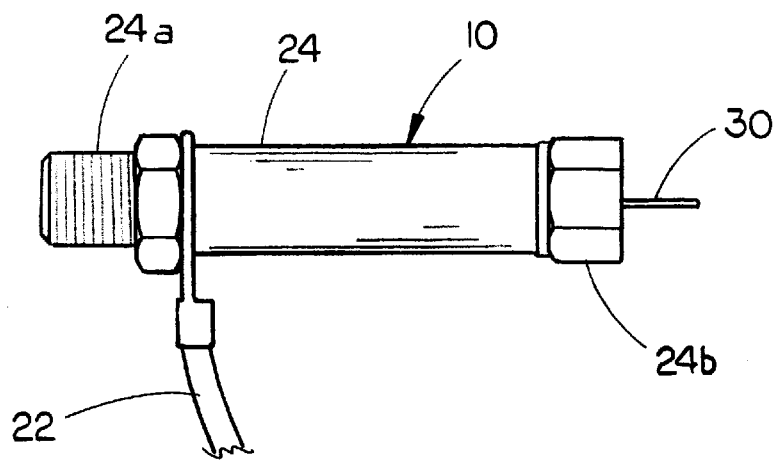
FIG. 2 is an elevational view of the surge protection device of the present invention.

Referring now to FIG. 2, surge protector 10 is shown with a female input end 24b, and a male output end 24a, and with shunt wire 22 electrically connected thereto. Center conductor wire 30 can be seen projecting from the female input end 24b.

In operation, it can be seen that the metallic tube 24, shown in FIG. 3, of surge protector 10 forms one conductor, which is electrically connected to the shield conductor 20b of cable 20, shown in FIG. 1. Center conductor 30 (shown in FIG. 3) permits the conduction of RF signals, and is electrically connected to conductor 20a of cable 20.

Referring once again to FIG. 3, the filings make light contact between conductors 24 and 30, and because of their composition tend to rapidly form a thin layer of oxide film upon their surfaces which prevents conduction of low power signals between the particles and electrodes. The filings therefore form a resistive and capacitive barrier between the electrodes. The oxide layer existing at each point of contact between the particles acts as a capacitive dielectric between the particles. In fact, at a state of rest, the resistance between the conductors is greater than 500 million ohms. When a voltage difference greater than 10 volts is applied to the filings, the oxide dielectric is ruptured between the particles, the center conductor wire, and the housing, such that the resistance between the particles and thus between the center conductor and housing drops to less than 10 ohms. In this way, voltages of greater than 10 volts will be shunted through the electrically conductive bridge formed by filings 32 between conductor 30 and housing 24 and thence through ground wire 22. This electrically conductive bridge formed by filings 32 is maintained until a physical dynamic shock to the tube displaces the particles and destroys the conductive paths, which in turn causes the filings to establish new dielectric barriers.

Once the surge protector 10 has been returned to the "at rest" state, low voltages of 10 volts or less are again permitted to pass through and be conducted by conductor 30 and 24.

It has been found that the speed at which the surge protector reacts so as to change from the "at rest" non-conductive state to the conductive state, is directly proportional to the speed of the impressed wave front of the surge conducted through the device. This surge, or voltage imbalance, is thus conducted through the shunt wire 22 to an earth safety ground, where the voltages are equalized, to thereby cause ground currents to flow around the equipment through the shunt, rather than through the electronic equipment.

Figure 4:
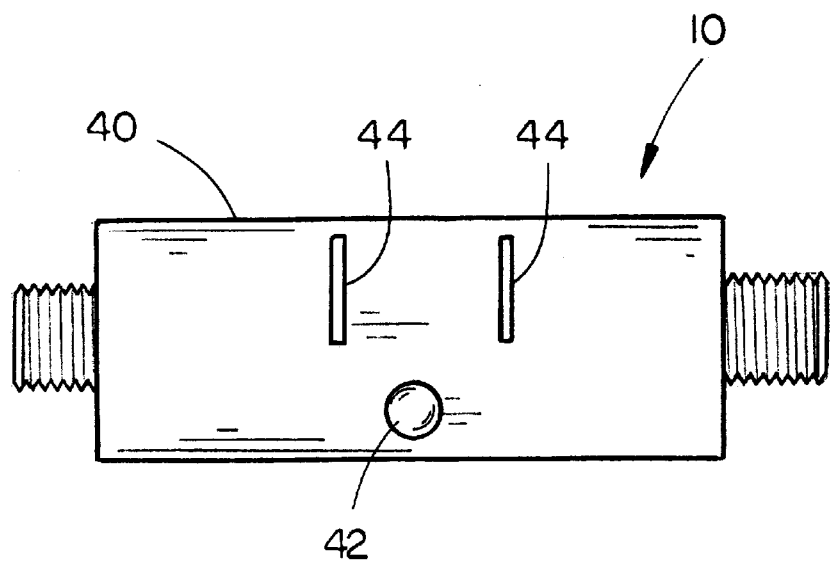
FIG. 4 is an elevational view of a third embodiment of the invention.
Figure 5:
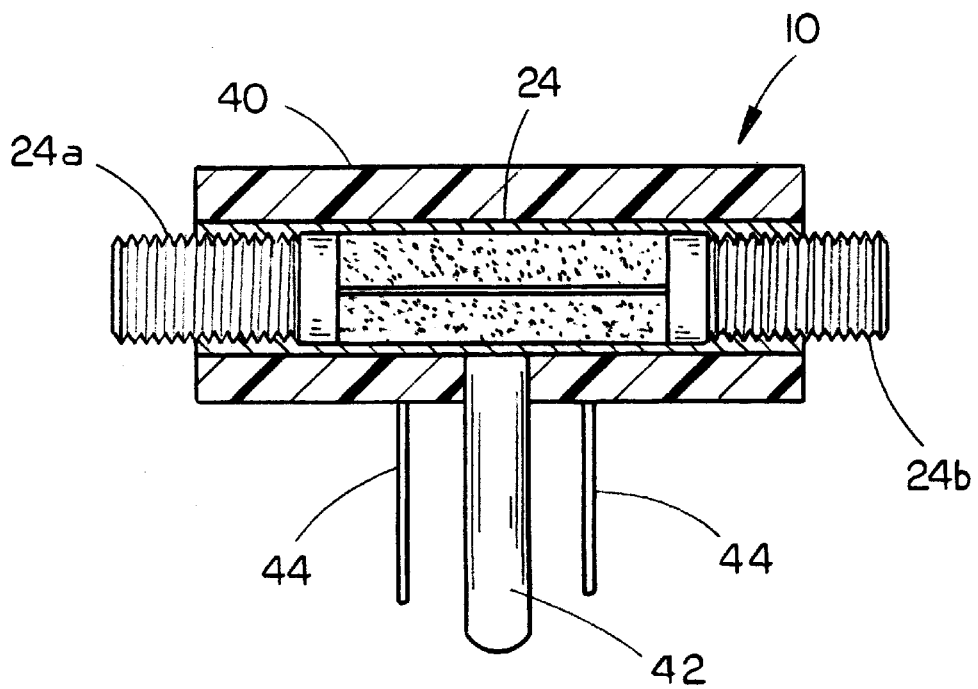
FIG. 5 is a top plan view of the embodiment shown in FIG. 4, with portions shown in section for clarity.

Referring now to FIGS. 4 and 5, another embodiment of the surge protector 10 is shown. In this embodiment, tube 24 is encased within a non-conductive housing 40 with ends 24a and 24b projecting outwardly therefrom. In the embodiment shown in FIGS. 4 and 5, metal tube 24 is electrically connected to a projecting prong 42, which projects out of a forward face of housing 40. Prong 42 is of a shape and size to permit insertion into the ground aperture of a conventional outlet receptacle to thereby directly connect tube 24 to this safety ground. A pair of non-conductive blades 44 are also provided, for insertion into the remaining two apertures of the conventional grounded outlet, but without any electrical connection thereto.

Referring once again to FIG. 3, it is preferred that the various electrically conductive portions of the surge protector be composed of different metals. The ideal embodiment utilizes filings 32 of aluminum, a center conductor 30 of copper, and tube 24 and its cylindrical inner wall being plated with nickel, chrome, or brass. The dissimilarity of the metals employed tends to render the device more sensitive to subtle changes of magnitude of signals conducted therethrough.

On the other hand, the sensitivity of the device may be decreased by applying a coating on non-conductive material to center conductor 30. In this way, the "minimum" voltage to cause the electrical bridge to form is increased significantly. However, it is also likely that such a coating would greatly reduce the possibility of reuse of the device (since the "hole" burned through the coating by the increased voltage would not "heal" or be repaired).

Whereas the invention has been shown and described in connection with the preferred embodiment thereof, many modifications, substitutions and additions may be made which are within the intended broad scope of the appended claims.

We claim:

1. An electrical surge protector for electronic equipment, the electronic equipment having a power cord with a safety ground conductor and a separate two conductor cable connected thereto, comprising:

an elongated tube of electrically conductive material having first and second ends;

a pair of first and second stoppers of electrically non-conductive material mounted within each end of the tube to form an enclosed cavity therebetween;

an electrical conductor wire extending the length of the tube along the axis of the tube, and projecting through the stoppers;

a plurality of electrically conductive filings disposed loosely within the cavity in sufficient quantity to form an electrical bridge between the tube and conductor wire upon the occurrence of a voltage difference of a predetermined magnitude between the tube and conductor wire;

said tube electrically connected in series to one conductor of the two conductor cable; said conductor wire electrically connected in series to the second conductor of the two conductor cable; and a shunt wire electrically connected between the tube and the safety ground conductor of the power cord.

2. The surge protector of claim 1, wherein said particles are formed of a material having an electrical resistance of about 10 ohms when impressed with a voltage difference of greater than about 10 volts, and a resistance of more than 500 million ohms when impressed with a voltage difference of less than about 10 volts.

3. The surge protector of claim 1, wherein said electrical conductor wire is coated with a material resistant to electrical conductivity, such that the minimum voltage difference necessary to cause the filings to form an electrical bridge is greater than about 50 volts.

4. The surge protector of claim 2, wherein the filings, the tube and the conductor wire are formed of dissimilar materials.

5. The surge protector of claim 4, wherein:

the filings are formed of aluminum;

the wire conductor is formed of copper; and the tube is plated with a material selected from the group consisting of nickel, chrome and brass.

6. The surge protector of claim 1, wherein the filings, the tube and the conductor wire are formed of dissimilar materials.

7. The surge protector of claim 6, wherein:

the filings are formed of aluminum;

the wire conductor is formed of copper; and the tube is plated with a material selected from the group consisting of nickel, chrome and brass.

8. An electrical surge protector, comprising:

an elongated tube of electrically conductive material having first and second ends;

a pair of first and second stoppers of electrically non-conductive material mounted within each end of the tube to form an enclosed cavity therebetween;

an electrical conductor wire extending the length of the tube along the axis of the tube, and projecting through the stoppers;

a plurality of electrically conductive filings disposed loosely within the cavity in sufficient quantity to form an electrical bridge between the tube and conductor wire upon the occurrence of a voltage difference of a predetermined magnitude between the tube and conductor wire;

means on each end of said tube for electrically connecting a first conductor to the tube and a second conductor to the conductor wire; and a shunt wire electrically connected at one end to the tube, and adapted for electrical connection at an opposite end to an earth ground.

9. The surge protector of claim 8, wherein said particles are formed of a material having an electrical resistance of about 10 ohms when impressed with a voltage difference of greater than about 10 volts, and a resistance of more than 500 million ohms when impressed with a voltage difference of less than about 10 volts.

10. The surge protector of claim 8, wherein said electrical conductor wire is coated with a material resistant to electrical conductivity, such that the minimum voltage difference necessary to cause the filings to form an electrical bridge is greater than about 50 volts.

11. The surge protector of claim 9, wherein the filings, the tube and the conductor wire are formed of dissimilar materials.

12. The surge protector of claim 11, wherein:

the filings are formed of aluminum;

the wire conductor is formed of copper; and the tube is plated with a material selected from the group consisting of nickel, chrome and brass.

13. The surge protector of claim 12, further comprising:

an electrically non-conductive housing formed around substantially the entire length of the tube; and wherein said shunt wire projects through the housing.

14. The surge protector of claim 13, further comprising:

a pair of parallel, electrically non-conductive blades projecting outwardly from the housing, generally transverse to the axis of the tube; and wherein said shunt wire is in the form of a prong projecting outwardly from the housing parallel to the blades; said blades and prong shaped and arranged for selective insertion into a conventional electrical outlet.

15. A method for selectively equalizing a voltage difference between first and second electrical conductors in a cable, comprising the steps of:

interposing an electrically conductive tube serially in the first conductor, said tube including:

a pair of first and second stoppers of electrically non-conductive material mounted within each end of the tube to form an enclosed cavity therebetween;

an electrical conductor wire extending the length of the tube along the axis of the tube, and projecting through the stoppers; and a plurality of electrically conductive filings disposed loosely within the cavity in sufficient quantity to form an electrical bridge between the tube and conductor wire upon the occurrence of a voltage difference of a predetermined magnitude between the tube and conductor wire;

serially connecting the conductor wire in the tube to the second conductor; and electrically connecting a shunt wire from the tube to earth ground.

16. The method of claim 15, further comprising the step of applying a dynamic impact force upon the tube of sufficient magnitude to collapse the electrical bridge of filings formed between the tube and conductor wire upon the occurrence of a voltage difference of predetermined magnitude between the tube and conductor wire.

* * * * *